United States Patent [19]
Vosolsobe et al.

[11] 3,853,790
[45] Dec. 10, 1974

[54] CATALYSTS FOR THE OXIDATION OF AMMONIA TO NITROGEN OXIDE

[75] Inventors: Jan Vosolsobe; Rudolf Dohnalek; Bohumil Kadlec; Jiri Michalek; Antonin Simecek; Miroslav Cap, all of Praha; Miroslav Novak, Ricany, all of Czechoslovakia

[73] Assignee: Trust Ceskoslovenskeho prumyslu dusikarenskeho, Praha, Czechoslovakia

[22] Filed: Aug. 7, 1972

[21] Appl. No.: 278,261

Related U.S. Application Data

[63] Continuation-in-part of Ser. No. 242,216, April 7, 1972, abandoned.

[30] Foreign Application Priority Data

Apr. 7, 1971 Czechoslovakia................ 2486-71

[52] U.S. Cl................ 252/464, 252/466 J, 423/404
[51] Int. Cl........................... B01j 11/06, B01j 11/22
[58] Field of Search........... 252/466 J, 464; 423/404

[56] References Cited
UNITED STATES PATENTS

| | | | |
|---|---|---|---|
| 1,207,708 | 12/1916 | Bosch et al. | 252/467 X |
| 3,368,982 | 2/1968 | Milbourne | 252/466 J |
| 3,641,182 | 2/1972 | Box et al. | 252/466 J |

*Primary Examiner*—Daniel E. Wyman
*Assistant Examiner*—W. J. Shine

[57] ABSTRACT

A catalyst for oxidation of ammonia to nitrogen oxide, in the form of granules, based on oxides of the metals of the group iron, cobalt and nickel, with or without the addition of a promoter with a support based on oxygen-containing compounds of aluminum and method of producing them and more particularly, a) a catalyst for the oxidation of ammonia to nitrogen oxide, in the form of granules with a sintered, porous alumina carrier, formed at least on the outer periphery by an alumina spinel and with a film of catalytically active nickel and cobalt oxides, especially cobaltous-cobaltic oxide with or without an added promotor on the spinel layer, as well as the method of producing and using it.

2 Claims, No Drawings

CATALYSTS FOR THE OXIDATION OF AMMONIA TO NITROGEN OXIDE

This application is a continuation-in-part application of copending application Ser. No. 242,216, filed Apr. 7, 1972, now abandoned and entitled "Catalysts for the Oxidation of Ammonia to Nitrogen Oxide and the Method of Producing Themo"

The invention relates to a catalyst for the oxidation of ammonia to nitrogen oxide based on oxides of metals of the group iron, cobalt, and nickel, sometimes with addition of a promoter, contained in a solid sintered inactive support based on the spinel compounds of aluminum, and also the means of producing the catalyst.

Some of the most effective types of new non-platinum catalysts for oxidizing ammonia to nitrogen oxide are catalysts based on metal oxides of the group iron, cobalt, and nickel; and especially are these catalysts based on cobalt oxides (e.g., $Co_3O_4$) or iron oxides (e.g. $Fe_2O_3$) with promoters such as the oxides of chromium, bismuth, manganese, and magnesium. The support for the active catalytic component is amorphous aluminum oxide, which may contain calcium oxide, used in the form of crushed tablets.

Most methods for producing these catalysts consist essentially of mixing the active component (and, if necessary, the calcium compound) or its thermally decomposable compound, with the basic support material, e.g., aluminum oxide, forming the resulting mixture into the shape of a tablet, and thermal treatment at lower temperatures.

These methods have many disadvantages, which appear in the properties of the thus produced catalysts. The produced tablets must, before use in the reactor, be crushed to small granules which, in industrial use, considerably increase the resistance of the catalyst bed. Considerable drawbacks are also other unfavorable qualities, i.e. low mechanical strength and the short life of the catalytic activity, especially at higher temperatures. The low mechanical strength is caused by the amorphous structure of the support. A considerable decrease in catalytic activity at higher temperatures of operation is especially unfavorable with work at higher pressures, when, to obtain a satisfactory reaction yield, it is necessary to work at higher temperatures. This is caused by the progressive reaction between the support and the metal oxide, during which the amount of oxide capable of catalyzing the reaction, steadily decreases.

These inadequacies are, to a large degree, removed from or avoided in the catalyst by its prpduction according to the invention. The catalyst for the oxidation of ammonia to nitrogen oxide is in the form of particles based on the oxides of metals from the group iron, cobalt and nickel, with a support based on the oxygen-containing compounds of aluminum. The catalyst is formed from at least one of the catalytically active metal oxides, in some cases with an added promoter, contained in a solid, sintered, porous support, formed, at least in the areas of contact with the said metal oxides, by compounds of the spinel type, stable at the sintering temperature, thus the catalyst contains besides aluminum and oxygen, an oxide or oxides of the catalyst groups, in some cases with a promoter, or other spinel-forming oxides, in which the metal or metals besides aluminum, calculated as the oxides are contained in the catalyst in amounts up to 70 percent by weight.

The promoters are the oxides of manganese, bismuth, or magnesium, in all cases at least one of them. The catalyst preferably has a granular shape, e.g., rods with radius and length from 2 to 10 mm.

The method for producing the catalyst is a process during which the material for the preparation of the support is mixed with the catalytically active or promoter active compounds of the metals or precursors thereof and, formed into small particles, is subjected to thermal treatment. This method depends on the fact that aluminum oxide with at least one of the oxides of iron, cobalt, and nickel and/or at least one of the promoters or other oxides forming spinels with aluminum oxide, stable at the sintering temperature, are mixed in proportions of 30 to 90 weight percent of aluminum oxide to 10 to 70 weight percent of the additives, and, after the resultant mixture is formed into granules, preferably rods, these are dried and sintered at a temperature of 1,000°–1,700°C. After slow cooling, they are impregnated with a concentrated solution or a melt of a salt or salts of at least one of the metals of the catalyst group and, in some cases, of the promoters, thermally decomposable to give the catalytically or promoter active oxides and, after impregnation, they are heated to the decomposition of the mentioned salts, i.e., preferably at a temperature of 300°–700°C.

Another possibility for use of the method according to the invention lies in the fact that the granules, preferably shaped as rods, are prepared for sintering by shaping them from aluminum oxide, impregnating them with a concentrated solution or with a melt of a salt or salts of at least one of the metals of the group iron, cobalt, and nickel, and/or from the group of promoters or other metals, thermally decomposable to the compounds yielding spinels with aluminum oxides, stable at the sintering temperature, and after impregnation are heated to the decomposition of the mentioned salts at a temperature of 300°–700°C.

The basic steps of the method for preparing the catalysts of the invention are outlined as follows:

1. Preparation of the carrier material a. Ground aluminum trioxide is homogeneously mixed with the powder-like additives, i.e., the catalytically active metallic oxides and/or promoters, possibly also with other spinel-forming compounds and, after addition of water and a common plasticizer, the thus formed moist material is kneaded into a plastic dough, from which granules, e.g., small cylinders, are formed. The weight ratio in which aluminum trioxide is mixed with the additives depends upon the compounds which were used as additives. This varies from 30 to 90 percent by weight of the oxide and 10 to 70 70percent by weight of additives.

b. The other (alternative) preparation of the carrier material is based on kneading ground aluminum trioxide, after adding water and a plasticizer, to form a plastic dough from which granules are formed. These are impregnated with a concentrated solution of salts yielding, on subsequent thermal decomposition, catalytically and/or promoter active compounds, and possibly other spinel-forming compounds.

2. The drying of the moist granules

The granules formed, prepared according to one of the above alternatives, (a) or (b), are gradually dried, first at room temperature, then in a drying oven at 105°C.

3. Thermal decomposition of the salts with which the granules were impregnated

This step comes into consideration only with the procedure corresponding to alternative (b) described above in the first step. The dried granules are treated, generally for about 1 hour, at the decomposition temperature of the given impregnating salts; this temperature varies from 300° to 700°C., according to the type of impregnating salts used.

4. Heating of the granules (sintering)

The dried granules, which may have been subjected to heating in Step 3., are heated, according to the type of compound used in the preparation of the carrier material, at 1,000° to 1,700°C., until the sintered, porous structure of the carrier material is achieved.

5. Cooling of the sintered granules

The sintered granules are allowed to cool gradually to room temperature.

6. Impregnation of the sintered granules

The sintered granules are impregnated with a concentrated solution of salts yielding, on thermal decomposition, catalytically and/or promoter active compounds.

7. Drying of the impregnated sintered granules

Drying is carried out in the same manner as described in Step 2., or is carried out by gradual heating to the decomposition temperature as described in Step 8., below.

8. Thermal decomposition of the salts with which the sintered granules have been impregnated The dried granules are heated for 1 to 3 hours, at a temperature of from 300° to 700°C. according to the type of compounds which were used for impregnation of the sintered granules. After completion of the decomposition, the granules are left to cool gradually and are then stored until used.

The described catalyst and means of production have, compared to the state of the technology in this field up until now, many advantages. A support is obtained which, for the most part, does not react with the active component, which guarantees the long term life of the activity of the catalyst in a wide temperature range (600°–1,000°C).

An outstanding advantage of the catalyst is its high mechanical stability as the result of the sintered form of the support, so that, even under the effect of high and varying temperatures, it does not disintegrate or erode and does not clog either the apparatus or the product with ashes. Further advantages lie in the easy regeneration and the fact that it can be produced in granules which need not be further crushed into particles of smaller dimensions; thus one of the operations of the production procedure is no longer necessary and, moreover, a product is obtained which does not disproportionately increase the resistance of the catalyst bed. For this reason, it is possible, according to the invention, to intensify considerably with the catalyst the catalyzed production process and further to increase the advantages of catalysts without platinum.

EXAMPLE 1

As a possible practical example of the catalyst and the method of its production according to the invention there can be described the catalyst based on cobalt oxides, particularly cobaltous-cobaltic oxide, $Co_3O_4$.

Finely ground cobaltous-cobaltic oxide is mixed with finely ground aluminum oxide in the required ratio e.g. 30% $Co_3O_4$ and 70% $Al_2O_3$, is homogenized, and, after addition of a plasticizer and water, is kneaded, and the resulting material is formed into granules shaped as rods 8–10 mm in diameter and 10 mm long. After drying, the granules are fired at a temperaure of 1700°C., which is attained stepwise in the furnace. After completion of the heating, the fired granules are allowed to cool slowly. Thus there are obtained sintered, porous granules with spinel character, which are further impregnated by soaking in a concentrated solution of cobalt (II) nitrate. The impregnated granules are further subjected to thermal treatment at 300°C., by which cobalt nitrate is converted into catalytically active cobaltous-cobaltic oxide.

EXAMPLE 2

Another possible method for preparing the granules for sintering is described below for the case of an example of the method of producing catalysts with promoters.

During production of the catalyst based on ferric oxide, which, for its functioning, requires the presence of a promoter, the procedure is thus, e.g., that aluminum oxide in the form of rods 10 mm in diameter and 10 mm long is impregnated with a concentrated solution of ferric nitrate. After drying at a temperature of 150°C. and decomposition of nitrate to oxide at a temperature of 300°–400°C., the rods are sintered at a temperature of 1400°C. After slow cooling, the rods are impregnated with a concentrated solution of ferric nitrate and magnesium nitrate, containing amounts in such a ratio that the material ratio $MgO:Fe_2O_3$, which will result after subsequent heating of the impregnated granules at 300°–400°C., will be 5:95.

EXAMPLE 3

First, the carrier is prepared by a procedure in which 50 percent by weight of finely ground $Al_2O_3$ is, while wet, mixed with 45 percent by weight of powder-like cobaltous-cobaltic oxide, $Co_3O_4$. The pulpy material formed is shaped into granules with a diameter of 8 mm and a length of 10 mm. After drying for 24 hours - first at a temperature of 20° to 30°C. and later in a drying oven at 105°C., the granules are sintered at a temperature of 1600°C. After gradual cooling, the sintered porous carrier thus formed is impregnated with a concentrated solution of cobalt (II) nitrate with the addition of 1 to 2% nickel (II) nitrate. The impregnated granules are subjected to a thermal treatment at 700°C. for approximately one hour during which the nitrates are converted to the catalytically active metallic oxides.

EXAMPLE 4

In the catalyst preparation, 60% by weight of $Fe_2O_3$ is mixed with 40% by weight of $Al_2O_3$ and, while wet, the mixture is extruded through openings with a diameter of 10 mm. The rods thus formed are cut to obtain granules with a length of 10 mm. After gradual drying at room temperature, and in a drying oven, the granules are sintered at 1550°C. After cooling, the sintered porous granules are impregnated with a solution of the nitrates of cobalt (II) and bismuth (III), in which the bismuth content, calculated as $Bi_2O_3$, equals 7%.

The decomposition of the nitrates in the impregnated granules is carried out by heating for three hours at a temperature of 600°C.

The catalysts according to the invention can provide a conversion yield of ammonia to nitrogen oxide of up to 97.5%

They can be used for the oxidation of ammonia to nitrogen oxide at atmospheric to high pressures.

We claim:

1. A granular catalyst which consists essentially of an alumina body in solid form having particles at least the surfaces of which consist of a spinel in which the metal component of the spinel is selected from the group consisting of cobalt, cobalt-nickel, nickel-manganese, nickel-magnesium and nickel-bismuth, said particles additionally having thereon a film of catalytically active metal oxides selected from the group consisting of cobalt oxide, and combination of nickel oxide with either cobalt oxide, manganese oxide, magnesium oxide, or bismuth oxide, said catalyst having been prepared by heating an alumina body impregnated with metal or metals forming said spinel to a sintering temperature of 1,000°–1,700° C until said alumina body has reached a stable condition and the surfaces of the alumina in the outer periphery of the body have been converted to said spinel, and thereafter impregnating said body with metal salt or salts selected from the metals forming said group of metal oxides and thermally decomposing said metal salt or salts to provide on said spinel a film of catalytically active material of said metal oxides.

2. The catalyst according to claim 1 wherein the granules are shaped as rods, with diameter and length from 2 to 10 mm.

* * * * *